United States Patent Office 3,282,984
Patented Nov. 1, 1966

3,282,984
RACEMIZATION OF OPTICALLY ACTIVE TRANS-CHRYSANTHEMIC ACID
Masanao Matsui, Tokyo, and Kosuke Yoshioka, Hirakata-shi, Japan, assignors to Sumitomo Chemical Company, Ltd., Osaka, Japan, a corporation of Japan
No Drawing. Filed Dec. 17, 1963, Ser. No. 331,100
Claims priority, application Japan, Dec. 25, 1962, 37/58,845, 37/58,846
10 Claims. (Cl. 260—468)

This invention relates to the racemization of optically active trans-chrysanthemic acid. More particularly, it relates to a process for the racemization of an optically active trans-chrysanthemic acid through a novel intermediate ketol-acid compound.

As is well-known, chrysanthemic acid (or chrysanthemum mono-carboxylic acid) is an acidic moiety of pyrethrin, cinerin, allethrin, cyclethrin, and other pyrethroids, forming the insecticidal esters with keto-alcohols of pyrethrolone, cinerolone, allethrolone, cyclethrolone, and their analogs, respectively.

Among the isomers of trans-chrysanthemic acid, however, the levo-isomer yields optically active esters having extremely inferior insecticidal activities, as compared with the dextro-isomer and the racemic body yielding esters having superior insecticidal activities.

According to the process of the invention, levo-trans-chrysanthemic acid which is useless as the acidic moiety of pyrethroids may be derived to racemic transchrysanthemic acid which can be used as the acidic moiety directly or after optical resolution to separate the useful dextro-isomer from the useless levo-isomer.

The present invention provides a process for the racemization of optically active trans-chrysanthemic acid, which comprises a series of steps of oxidizing the optically active trans-chrysanthemic acid with a permanganate salt to yield optically active 2,2-dimethyl-3-(1'-oxo-2'-methyl-2'-hydroxypropyl)-1,3-trans-cyclopropane-1-carboxylic acid, esterifying the resulting acid to yield an optically active lower-alkyl ester thereof, racemizing the optically active ester with an alkali metal lower-alcoholate and then hydrolyzing the ester to yield the racemic acid, and reducing the racemic ester with hydrazine by the aid of a basic catalyst to yield racemic trans-chrysanthemic·acid.

Accordingly, it is an object of the present invention to provide a process by which optically active trans-chrysanthemic acid can be racemized by a novel series of steps. It is another object to provide a method of utilizing levo-trans-chrysanthemic acid which is useless as the acidic moiety of pyrethroids, by racemization to racemic trans-chrysanthemic acid. It is still another object to provide a novel compound, 2,2-dimethyl-3-(1'-oxo-2'-methyl-2'-hydroxypropyl)-1,3-trans-cyclopropane-1-carboxylic acid, and its lower alkyl esters, and to provide a method for preparing the same. It is a further object to provide a method for racemizing optically active 2,2-dimethyl-3-(1'-oxo-2'-methyl-2'-hydroxypropyl)-1,3-trans-cyclopropane-1-carboxylic acid. It is a still further object to provide a method for preparing trans-chrysanthemic acid by reducing 2,2-dimethyl-3-(1'-oxo-2'-methyl-2'-hydroxypropyl)-1,3-trans-cyclopropane-1-carboxylic acid. Other objects would be apparent from the following description.

In the first step of the process of the invention, an optically active chrysanthemic acid, which may be dextro or levo, is oxidized with a permanganate salt to yield optically active 2,2-dimethyl-3-(1'-oxo-2'-methyl-2'-hydroxypropyl)-1,3-trans-cyclopropane-1-carboxylic acid, the formula being

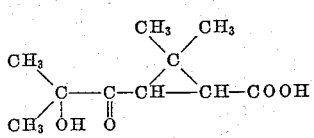

The conditions for the permanganate oxidation may be chosen according to the ordinary procedure for the oxidation of carbon-carbon double bond to yield oxygenated compound without rupture of carbon-carbon linkage. Ordinarily, an aqueous soluble permanganate salt, such as permanganate salts of alkali and alkali-earth metals, for example, lithium, sodium, potassium, calcium, barium, and so on, in an amount of 1 to 3 times as much as the theoretical is added to an aqueous solution or dispersion of chrysanthemic acid, preferably in the form of its water-soluble salt, at a temperature of about 25° to 100° C., preferably under efficiential stirring. The excess of the permanganate salt is decomposed with a reducing agent, such as methanol, formaldehyde, etc., and the reaction product is separated from manganese dioxide, and isolated by acidification.

Alternatively, the reaction product may be isolated by introducing sulfur dioxide gas into the reaction mixture thereby to change the manganese dioxide to a water-soluble salt.

The resulting optically active 2,2-dimethyl-3-(1'-oxo-2'-methyl-2'-hydroxypropyl)-1,3-trans-cyclopropane-1-carboxylic acid is a new compound unknown in the literatures, having M.P. 144.5°–145.5° C. (long prisms) and $[\alpha]_D^{20}= +$ or $-13.5°$ (in pyridine). Naturally, racemic chrysanthemic acid may be oxidized in similar way to yield the corresponding racemic ketol-acid.

In the second step of the process of the invention, the optically active ketol-acid thus-obtained is esterified according to the conventional procedure to yield an optically active lower-alkyl ester thereof. Ordinarily, the keto-acid may be treated with a mixture of a lower alcohol and a strong acid such as sulfuric and hydrochloric acids, heated with a lower alcohol in an organic solvent capable of distilling with water azeotropically, such as benzene, preferably, in the presence of a catalytic amount of an aromatic sulfonic acid such as p-toluenesulfonic acid, or heated with a lower dialkyl sulfate, such as dimethyl sulfate, in an aqueous alkaline medium. Alternatively, it is esterified by use of diazomethane to form the methyl ester thereof.

In the third step of the process, the optically active lower-alkyl ester of the ketol-acid is racemized to yield the racemic acid. The racemization is conducted by treating the optically active ester with an alkali metal lower-alcoholate.

In the ketol-acid, the substituents at 1–C and 3–C positions at the cyclopropane ring are attached relatively in trans arrangement. Hence, the racemization of the optically active ketol-acid necessitates epimerization at the both 1-C and 3-C at the same time, thereby to reserve relatively trans arrangement of the substituents at 1-C and 3-C even after the epimerization. The inventors have now found that the present step of the process can easily accomplish the racemization according to such mechanism.

In carrying out the present step of the process, the optically active ketol-acid ester is contacted with an alkali metal lower-alcoholate in an amount of 0.5 to 10 mols, preferably more than 1 mol, per mol of the ketol-acid ester, in an inert liquid medium at room temperature, or preferably at a suitably elevated temperature. The racemization proceeds with high efficiency, accompanying ester-exchange reaction if the alkyl radical in the ketol-acid ester material and that in the alkali metal alcoholate are different from each other. As the alkali metal lower-alcoholate, sodium ethylate, potassium ethylate, potassium tert.-butyrate, sodium tert.-amylate, potassium tert.-amylate, and other alcoholate having 1 to 6 carbon atoms which are known to have catalytic ability for ester-exchange reaction can be employed. The suitable liquid media in which the present step may be effected involve lower alcohols, such as methyl, ethyl, tert.-butyl, and the like alcohols. Others such as liquid aromatic hydrocarbons, e.g. benzene, toluene, etc., petroleum hydrocarbons, e.g. petroleum ether, ligroin, etc., and other solvents which are inert to the present racemization reaction, may also be employed alone, in a mixture of them or with a lower alcohol. The temperature for the racemization reaction may generally be selected within the range of room temperature and about 150° C., although upper and lower temperatures may be used. The reaction may be carried out in an autoclave if required. The period of time necessary for the reaction varies depending upon the temperature. The higher the temperature, the higher the reaction rate. In general, 5 to 10 hours may suffice in case of the temperature of about 80° C. After the reaction is finished, the racemic ketol-acid ester is hydrolyzed, ordinarily by adding a suitable amount of water, heating the resulting mixture, removing the organic liquid medium by distillation or fractionation, and acidifying the reaction mixture to isolate the racemic ketol-acid.

Alternatively, the liquid medium may be removed after the completion of the reaction without addition of water, and the residue may be cooled and then treated with water, while restraining the hydrolysis as far as possible, thereby to isolate the crystalline racemic ketol-acid ester. In this ester, it was observed that the alkyl residue of the material ester has been exchanged with the alkyl residue of the alcoholate, when the both alkyl radicals are different from each other. In the aqeuous layer separated from the ester, the alkali salt of incompletely racemized ketol-acid was found, which can then be again esterified and racemized according to the present step of the process. The racemic ketol-acid ester isolated can be hydrolyzed, according to the conventional procedure.

The racemic 2,2-dimethyl-3-(1'-oxo-2'-methyl-2'-hydroxypropyl) - 1,3 - trans-cyclopropane-1-carboxylic acid thus-obtained is also a novel compound, having M.P. 142.5°–143.0° C.

In the fourth step of the process of the invention, the racemic ketol-acid is reduced with hydrazine by the aid of a basic catalyst to yield racemic trans-chrysanthemic acid. It has been well-known in the name of Wolf-Kishner's reaction, that a ketone is treated with hydrazine to form the hydrazone, and the latter is heated in the presence of a basic catalyst to effect a de-nitrogen gas reaction, whereby the ketone group is reduced to the methylene group. Accordingly, it is expected that 2,2-dimethyl-3 - (1' - oxo-2'-methyl-2'-hydroxypropyl)-1,3-trans-cyclopropane-1-carboxylic acid could be reduced to 2,2-dimethyl - 3 - (2' - methyl-2'-hydroxypropyl)-1,3-trans-cyclopropane-1-carboxylic acid according to the procedure of Wolf-Kishner's reaction, as shown in the following route.

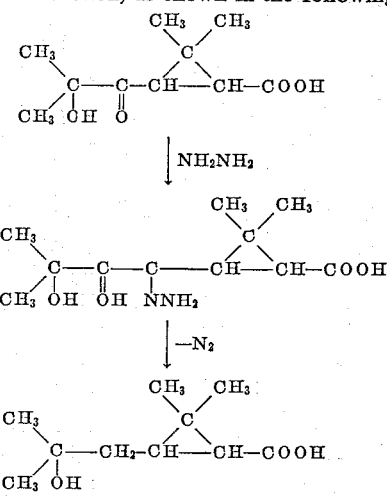

In the practical reaction, however, the present inventors found that the Wolf-Kishner's reaction of the present ketol-acid yields directly trans-chrysanthemic acid, accompanying the dehydration reaction of 2,2-dimethyl-3-(2'-methyl - 2'-hydroxypropyl)-1,3-trans-cyclopropane-1-carboxylic acid. This fact is exceedingly advantageous for the object of the present process.

The reaction conditions in the present step is as in the conventional procedure of Wolf-Kishner's reaction. Hydrazine may be employed in almost equimolar or theoretical, or somewhat excess amount in the form of hydrate, an aqueous solution thereof, or anhydrous state. A suitable solvent may be employed, although not indispensable, in order to ensure the smooth and complete reaction. The illustrative examples of the solvent involve higher-boiling alcohols such as diethylene glycol, triethylene glycol, etc., since the de-nitrogen reaction proceeds ordinarily at a comparatively high temperature, for instance at 180° to 220° C., the solvent is so selected that its boiling point is almost the same or higher than the de-nitrogen decomposition temperature. Since the decomposition temperature varies depending upon the various condition, for example, kinds of solvent, catalyst and others, the temperature is not necessarily defined within the range as identified above. The basic catalysts which is employed in an amount of at least 1 mol per mol of the ketol-acid in the present step involve alkali metal hydroxides and lower-alcoholates, such as potassium hydroxide, sodium hydroxide, sodium methylate, sodium ethylate, and the like. The reaction is finished within the range of 1 and 5 hours, in general, but it may be longer or shorter, depending upon the combination of the conditions. Upon completion of the reaction, the reaction mixture is acidified and objective racemic trans-chrysanthemic acid is separated, for example, by extraction with an organic solvent. Naturally, the present step may be conducted in similar way starting from an optically active 2,2 - dimethyl-3-(1'-oxo-2'-methyl-2'-hydroxypropyl)-1,3-trans-cyclopropane-1-carboxylic acid to yield an optically active trans-chrysanthemic acid.

The process of the present invention is more minutely described with reference to the following examples, which are, however, set forth merely by way of illustration and not by way of limitation.

*Example 1 (the first step)*

Twenty grams of levo-trans-chrysanthemic acid $([\alpha]_D^{20} = -18.5°$ in chloroform$)$ is thoroughly dissolved into a solution consisting of 8 g. of sodium hydroxide and 800 cc. of water. To the solution, 60 g. of potassium permanganate is slowly added at a temperature of 40° to 42° C. under stirring, and, thereafter, the reaction mixture is kept at the temperature for additional one hour. Excess of potassium permanganate is reduced by addition of 10 cc. of methanol. The reaction mixture is filtered by suction, and the separated manganese dioxide is washed with 200 cc. of hot water. The filtrate combined with the washings is evaporated in vacuo up to about 100 cc. volume, then acidified with concentrated hydrochloric acid, and extracted with ethyl ether. The extract yields 22 g. of colorless crystals after the evaporation of the ether, which yield, upon recrystallization from boiling water, long prisms of levo-2,2-dimethyl-3 - (1'- oxo-2'-methyl-2'-hydroxypropyl)-1,3-trans-cyclopropane-1-carboxylic acid, melting at 144.5° to 145.5° C., and having rotation of $[\alpha]_D^{20} = -13.5°$ (in pyridine).

Example 2 (the second step)

An ethyl ether solution of diazomethane prepared from 20 g. of nitrosomethyl urea is added to an ethyl ether solution of 20 g. of levo-2,2-dimethyl-3-(1'-oxo-2'-methyl-2'-hydroxypropyl)-1,3-trans-cyclopropane-1-carboxylic acid. When vigorous gas generation ceases, acetic acid is added to the solution to decompose the excess of diazomethane. The ether solution is washed with aqueous sodium bicarbonate solution to remove the acidic substance, washed with water and then dried. Upon removal of ethyl ether, 22 g. of the methyl ester of the acid is obtained in form of colorless, clear, viscous oil.

Example 3 (the second step)

Eight grams of hydrogen chloride is dissolved in 400 cc. of anhydrous methanol. To this solution, 35 g. of levo-2,2-dimethyl-3-(1'-oxo-2'-methyl-2'-hydroxypropyl)-1,3-trans-cyclopropane-1-carboxylic acid is added, and the mixture is allowed to stand for a week at room temperature.

An adequate amount of sodium bicarbonate is added to neutralize the reaction mixture and the mixture is filtered.

After removal of methanol, the residue is extracted with 100 cc. of ethyl ether. The etheral solution is washed once with cold water and is dried over anhydrous sodium sulfate.

Upon removal of ethyl ether, 34.0 g. of the methyl ester of the acid is obtained as in Example 2.

Example 4 (the third step)

To a potassium tert.-butylate solution prepared from 4 g. of potassium metal and 200 cc. of tert.-butyl alcohol, 3.9 g. of methyl levo-2,2-dimethyl-3-(1'-oxo-2'-methyl-2'-hydroxypropyl) - 1,3-trans-cyclopropane-1-carboxylate is added. The mixture is refluxed for 5 hours, and tert.-butyl alcohol is then distilled off in vacuo. The residue is mixed with dry benzene, and the mixture is shaken with ice-water for a while. The benzene layer is separated and washed with cool water. Removal of benzene from the benzene layer leaves almost colorless or pale brown oil, which crystallizes readily, M.P. 94° to 97° C., the yield being 2.8 g.

Upon recrystallization from n-hexane, colorless leeflets, melting at 98° to 99° C., is obtained. The analysis agrees with tert.-butyl 2,2-dimethyl-3-(1'-oxo-2'-methyl-2'-hydroxypropyl)-1,3-trans-cyclopropane-1-carboxylate.

*Analysis.*—Calculated (for $C_{14}H_{24}O_4$): C, 65.60%; H, 9.34%. Found: C, 65.44%; H, 9.44%.

The ester is hydrolyzed by refluxing in a dilute alcoholic potassium hydroxide solution and the free acid is separated according to the conventional procedure. The racemic 2,2-dimethyl-3-(1'-oxo-2'-methyl-2'-hydroxypropyl)-1,3-trans-cyclopropane-1-carboxylic acid thus obtained has M.P. 142.5° to 143.0° C., and is found to be identical with the authentic specimen from the results of a mixed-melting point determination and infrared spectrum tests.

The alkaline aqueous layer separated from the benzene layer in the foregoing experiment is concentrated in vacuo and then acidified with hydrochloric acid. The isolated brown crystals are separated and recrystallized from water, using active carbon, thereby to yield 600 mg. of the incompletely racemized acid, M.P. 140.5° to 142.0° C.

Example 5 (the third step)

To a sodium methylate solution prepared from 2 g. of sodium metal and 60 cc. of methanol, 2.0 g. of methyl levo-2,2-dimethyl-3-(1'-oxo-2'-methyl-2'-hydroxypropyl)-1,3-trans-cyclopropane-1-carboxylate is added. The mixture is refluxed for 10 hours. The reaction mixture is treated as in Example 4, and 0.3 g. of a neutral substance is obtained, which solidifies when stood still. Upon washing with petroleum ether, it shows M.P. 42° to 43° C., and is found to be identical with the authentic specimen of racemic methyl 2,2-dimethyl-3-(1'-oxo-2'-methyl-2'-hydroxypropyl) - 1,3 - trans - cyclopropane-1-carboxylate from the results of a mixed-melting point determination and infrared spectrum tests.

Hydrolysis of the ester yields the same racemic acid as in Example 4.

Example 6 (the fourth step)

A mixture of 3 g. of racemic 2,2-dimethyl-3-(1'-oxo-2'-methyl-2'-hydroxypropyl)-1,3-cyclopropane - 1 - carboxylic acid, 2.8 g. of potassium hydroxide, 5 cc. of 85% hydrazine hydrate solution, and 15 cc. of diethylene glycol is slowly heated up to 195° C. within about one and a half hours while being stirred. The water distilled out during the course is taken out of the reaction system. The system is kept at a temperature of 195° to 205° C. with stirring, whereby generation of nitrogen gas is finished. The reaction mixture is cooled, mixed with 15 cc. of water, and then acidified with hydrochloric acid. The isolated oil is extracted with ether. Evaporation of the ether from the extract leaves 1.5 g. of almost colorless oily product, which yields, upon purification through the S-benzylthiuronium salt, purified racemic trans-chrysanthemic acid, melting at 49° to 53° C. This is found to be identical with the authentic specimen from the results of a mixed-melting point determination and infrared spectrum tests.

What we claim is:

1. A process for the racemization of an optically active trans-chrysanthemic acid, which comprises a series of steps of oxidizing the optically active trans-chrysanthemic acid with a permanganate salt to yield an optically active 2,2 - dimethyl-3-(1'-oxo-2'-methyl-2'-hydroxypropyl) - 1,3-trans-cyclopropane-1-carboxylic acid, esterifying the resulting acid to yield an optically active lower-alkyl ester thereof, racemizing the optically active ester with an alkali metal lower-alcoholate and then hydrolyzing the ester to yield the racemic acid, and reducing the racemic acid with hydrazine by the aid of a basic catalyst to yield racemic trans-chrysanthemic acid.

2. A process according to claim 1, wherein the first step, the oxidation, is effected by contacting an aqueous soluble permanganate salt in an amount of 1 to 3 times as much as the theoretical with the trans-chysanthemic acid in an alkaline aqueous solution at a temperature of about 25° to 100° C., and separating the optically active 2,2-dimethyl-3-(1'-oxo-2'-methyl - 2'-hydroxypropyl)-1,3-transcyclopropane-1-carboxylic acid from the reaction mixture.

3. A process according to claim 2, wherein the said permanganate salt is potassium permanganate.

4. A process according to claim 1, wherein the third step, the racemization, is effected by contacting the optically active lower alkyl 2,2-dimethyl-3-(1'-oxo-2'-methyl-2' - hydroxypropyl)-1,3-trans-cyclopropane-1-carboxylate with an alkali metal lower-alcoholate in an inert liquid medium at a temperature of from room temperature to about 150° C., and separating the racemized acid from the reaction mixture after hydrolysis.

5. A process according to claim 1, wherein the fourth step, the reduction, is effected by heating the racemic 2,2-dimethyl - 3 - (1'-oxo-2'-methyl-2'-hydroxypropyl)-1,3- trans-cyclopropane-1-carboxylic acid with at least equimolar amount of hydrazine in the presence of a basic catalyst at a temperature of 180° to 220° C. in an inert solvent having a boiling point of at lowest the heating temperature.

6. Optically active or racemic 2,2-dimethyl-3-(1'-oxo-2'-methyl-2'-hydroxypropyl)-1,3-trans-cyclopropane - 1 - carboxylic acids, or the lower alkyl ester thereof.

7. A process for preparing 2,2-dimethyl-3-(1'-oxo-2'-methyl-2'-hydroxypropyl)-1,3-trans-cyclopropane-1 - carboxylic acid, which comprises contacting an aqueous soluble permanganate salt in an amount of 1 to 3 times as much as the theoretical with trans-chrysanthemic acid in an alkaline aqueous solution at a temperature of about 25° to 100° C., and separating the acid product from the reaction mixture.

8. A process according to claim 7, wherein the said permanganate salt is potassium permanganate.

9. A process for the racemization of a lower alkyl ester of an optically active 2,2-dimethyl-3-(1'-oxo-2'-methyl-2' - hydroxypropyl)-1,3-trans-cyclopropane-1-carboxylic acid, which comprises contacting the said ester with an alkali metal lower-alcoholate in an inert liquid medium at a temperature of from room temperature to about 150° C.

10. A process for preparing trans-chrysanthemic acid, which comprises heating 2,2-dimethyl-3-(1'oxo-2'-methyl-2'-hydroxpropyl)-1,3-trans-cyclopropane - 1 - carboxylic acid with at least equimolar amount of hydrazine in the presence of a basic catalyst at a temperature of 180° to 220° C. in an inert solvent having a boiling point of at lowest the heating temperature.

References Cited by the Examiner

Wheland, "Advanced Org. Chem.," 2nd Ed. (1949), pp. 255–261.

LORRAINE A. WEINBERGER, *Primary Examiner.*

R. K. JACKSON, *Assistant Examiner.*